United States Patent
Du

(10) Patent No.: US 11,438,102 B2
(45) Date of Patent: Sep. 6, 2022

(54) METHOD, APPARATUS, SYSTEM AND MEDIUM FOR TRANSMITTING HARQ

(71) Applicant: China Academy of Information and Communications Technology, Beijing (CN)

(72) Inventor: Ying Du, Beijing (CN)

(73) Assignee: China Academy of Information and Communications Technology, Beijing (CN)

( * ) Notice: Subject to any disclaimer, the term of this patent is extended or adjusted under 35 U.S.C. 154(b) by 304 days.

(21) Appl. No.: 16/871,801

(22) Filed: May 11, 2020

(65) Prior Publication Data
US 2020/0274646 A1 Aug. 27, 2020

Related U.S. Application Data

(63) Continuation of application No. PCT/CN2017/111530, filed on Nov. 17, 2017.

(51) Int. Cl.
*H04L 1/18* (2006.01)
*H04W 72/04* (2009.01)
(Continued)

(52) U.S. Cl.
CPC ....... *H04L 1/1812* (2013.01); *H04W 72/0446* (2013.01); *H04W 72/1278* (2013.01); *H04L 1/004* (2013.01)

(58) Field of Classification Search
CPC ... H04W 74/08; H04W 72/12; H04W 56/001; H04W 56/004; H04B 17/364; H04B 7/06;
(Continued)

(56) References Cited

U.S. PATENT DOCUMENTS

| 2015/0146643 A1 | 5/2015 | Fu et al. |
| 2017/0171883 A1 | 6/2017 | Noh et al. |
| 2019/0021119 A1* | 1/2019 | Ng .................. H04W 48/10 |

FOREIGN PATENT DOCUMENTS

| CN | 101247552 A | 8/2008 |
| CN | 101605395 A | 12/2009 |
(Continued)

OTHER PUBLICATIONS

Chinese Office Action dated Dec. 27, 2019 for corresponding Chinese Application No. 201711121875.7, filed Nov. 14, 2017 is provided, along with an English-language translation of the Office Action.
(Continued)

*Primary Examiner* — Iqbal Zaidi
(74) *Attorney, Agent, or Firm* — Burris Law, PLLC

(57) ABSTRACT

A method, apparatus, system and medium for transmitting Hybrid Automatic Repeat ReQuest (HARQ). The method includes: receiving, by User Equipment (UE) a first downlink control channel, and the first downlink control channel being used by a network device to schedule the UE to receive a first downlink channel; determining, by the UE, a first uplink channel; sending, by the UE, a HARQ-ACK corresponding to each channel in a first downlink channel set on the first uplink channel, the first downlink channel belonging to the first downlink channel set, and downlink channels included in the first downlink channel set being located in a first HARQ window.

17 Claims, 8 Drawing Sheets

(51) Int. Cl.
*H04W 72/12* (2009.01)
*H04L 1/00* (2006.01)

(58) Field of Classification Search
CPC ... H04B 17/318; H04B 17/373; H04L 5/0048; H04L 5/0082
See application file for complete search history.

(56) References Cited

FOREIGN PATENT DOCUMENTS

| | | |
|---|---|---|
| CN | 102820960 A | 12/2012 |
| CN | 103209061 A | 7/2013 |
| CN | 103516496 A | 1/2014 |
| CN | 105356980 A | 2/2016 |
| CN | 106712912 A | 5/2017 |
| CN | 107332646 A | 11/2017 |
| WO | WO2017052345 A1 | 3/2017 |

OTHER PUBLICATIONS

English translations of International Search Report and Written Opinion from International (PCT) Patent Application PCT/CN2017/11530 are provided.

\* cited by examiner

METHOD, APPARATUS, SYSTEM AND MEDIUM FOR TRANSMITTING HARQ

CROSS-REFERENCE TO RELATED APPLICATIONS

This application is a continuation of International Patent Application No. PCT/CN2017/111530 filed Nov. 17, 2017, which claims the benefit and priority of Chinese Patent Application, No. 201711121875.7, entitled "METHOD, APPARATUS, SYSTEM AND MEDIUM FOR TRANSMITTING HARQ", filed Nov. 14, 2017. The entire disclosures of each of the above-referenced applications are incorporated by reference.

FIELD

The present application relates to the field of network security technologies, and in particular, to a method, apparatus, system and medium for transmitting HARQ.

BACKGROUND

Hybrid Automatic Repeat ReQuest (HARQ) is a technology combining Feed-forward Error Correction (FEC) and Automatic Repeat-ReQuest (ARQ). With this technology, User Equipment (UE) provides acknowledgement (ACK) information or non-acknowledgement (NACK) information for received downlink service data, so that a network device determines whether to reschedule the downlink service data or schedule new downlink service data for the UE. The ACK information and the NACK information are collectively referred to HARQ-ACK information.

In a Long Term Evolution (LTE) system, the scheduling information of one downlink (DL) subframe and data of this downlink subframe are transmitted in the same subframe. That is, a Physical Downlink Control Channel (PDCCH) and its corresponding scheduled Physical Downlink Shared Channel (PDSCH) are located in the same subframe.

For a Frequency Division Dual (FDD) system, if the UE detects PDSCH transmission in a downlink subframe n−4, the UE feeds back its HARQ-ACK in the uplink subframe n.

For a Time Division Dual (TDD) system, if the UE detects PDSCH transmission in a downlink subframe n−k, the UE feeds back its HARQ-ACK in the uplink subframe n. k is not greater than K, and K corresponding to each uplink subframe is predefined. The definition of K for each UL-DL (uplink-downlink) configuration for TDD is shown in Table 1.

Downlink subframes included in a set K are called a HARQ feedback window, that is, HARQ-ACKs defined by downlink subframes in the HARQ feedback window are transmitted in the same uplink subframe.

TABLE 1

| UL-DL Config- | Downlink association set index K{$k_0, k_1, \ldots k_{M-1}$} for TDD Subframe n | | | | | | | | | |
|---|---|---|---|---|---|---|---|---|---|---|
| uration | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |

TABLE 1-continued

| UL-DL Config- | Downlink association set index K{$k_0, k_1, \ldots k_{M-1}$} for TDD Subframe n | | | | | | | | | |
|---|---|---|---|---|---|---|---|---|---|---|
| uration | 0 | 1 | 2 | 3 | 4 | 5 | 6 | 7 | 8 | 9 |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In the LTE system, each Component Carrier (CC) for carrier aggregation corresponds to an independent cell (Cell). Multiple Cells may be divided into one or multiple Cell groups. In each Cell group, one Cell is as a primary Cell, denoted as PCell, and the other Cells are as secondary Cells, denoted as SCells. In each Cell group, only the PCell is configured with a Physical Uplink Control Channel (PUCCH).

If the UE is served by PCell, SCell-1 and SCell-2, and these cells belong to the same Cell group, HARQ-ACK information for the downlink data in these cells is all transmitted on the PUCCH configured on the PCell. The HARQ-ACK sent by the UE in a subframe n of the PCell is also for the downlink data on all carriers in the HARQ feedback window corresponding to this subframe n.

In conventional technology, the HARQ feedback window is determined by a preset timing relationship between PDSCHs and HARQ-ACKs, and the size of HARQ-ACK codebook is determined semi-statically or dynamically according to the size of the HARQ feedback window. In the New Radio (NR) system, a timing relationship between data scheduling and the corresponding scheduled data transmission is flexible, and a timing relationship between downlink data transmission and its corresponding HARQ-ACK is also flexible. However, the conventional technology does not disclose how to determine a HARQ feedback window corresponding to HARQ-ACKs sent on an uplink channel, and how to determine the HARQ-ACK codebook.

SUMMARY

Embodiments of the present application provide a method, apparatus, system and medium for transmitting a HARQ.

A method for transmitting a HARQ includes: receiving, by UE, a first downlink control channel, and the first downlink control channel being used by a network device to schedule the UE to receive a first downlink channel; determining, by the UE, a first uplink channel; and sending, by the UE, a HARQ-ACK corresponding to each channel in a first downlink channel set on the first uplink channel, the first downlink channel belonging to the first downlink channel set, and downlink channels included in the first downlink channel set being located in a first HARQ window; wherein a time difference between a first reference downlink channel in the first HARQ window and the first uplink channel is equal to a first threshold, a time difference between a second reference downlink channel in the first HARQ window and the first uplink channel is equal to a second threshold, the first threshold and the second threshold are respectively a maximum value and a minimum value of duration supported by first timing information in the first downlink control channel, a start time occasion of the first reference downlink channel is a start time occasion of the first HARQ window, and an end time occasion of the second reference downlink channel is an end time occasion of the first HARQ window.

An apparatus for transmitting a HARQ includes one or more memories and one or more processors; the one or more memories are configured to store one or more instructions that, when executed by the one or more processors, cause the one or more processors to perform: receiving a first downlink control channel, and the first downlink control channel being used by a network device to schedule UE to receive a first downlink channel; determining a first uplink channel; and sending a HARQ-ACK corresponding to each channel in a first downlink channel set on the first uplink channel, the first downlink channel belonging to the first downlink channel set, and downlink channels included in the first downlink channel set being located in a first HARQ window; wherein a time difference between a first reference downlink channel in the first HARQ window and the first uplink channel is equal to a first threshold, a time difference between a second reference downlink channel in the first HARQ window and the first uplink channel is equal to a second threshold, the first threshold and the second threshold are respectively a maximum value and a minimum value of duration supported by first timing information in the first downlink control channel, a start time occasion of the first reference downlink channel is a start time occasion of the first HARQ window, and an end time occasion of the second reference downlink channel is an end time occasion of the first HARQ window.

A non-transitory storage medium for storing computer-readable instructions that, when executed, cause at least one processor to perform the above method.

DRAWINGS

DETAILED DESCRIPTION

In order to make the object, technical solution and merits of the present application clearer, the present application will be illustrated in detail hereinafter with reference to the accompanying drawings and specific embodiments. It should be understood that the embodiments described herein are only used to explain the present application, but not used to limit the present application.

In specific implementations of the present application, a method for transmitting a HARQ is provided. User Equipment (UE) sends a HARQ-ACK corresponding to each channel in a first downlink channel set on a first uplink channel. A corresponding HARQ window is determined according to the timing range of a first time indication in Downlink Control Information (DCI) and the time of the first uplink channel. The first downlink channel belongs to the first downlink channel set, and downlink channels included in the first downlink channel set are located in a first HARQ window. With this technical solution, a HARQ feedback window corresponding to the HARQ-ACK(s) sent on the uplink channel can be determined, and the HARQ-ACK codebook can also be determined.

This method may be applied to a radio communication system, and the radio communication system may include UE and a network device, such as gNodeB.

A process of transmitting a HARQ will be illustrated in detail below with reference to the accompanying drawings.

In the following description for the embodiments of the present application, the radio communication system is an NR system for an example.

A first embodiment describes a transmission process of a HARQ applied to downlink data transmission in a NR system.

Figure 1:
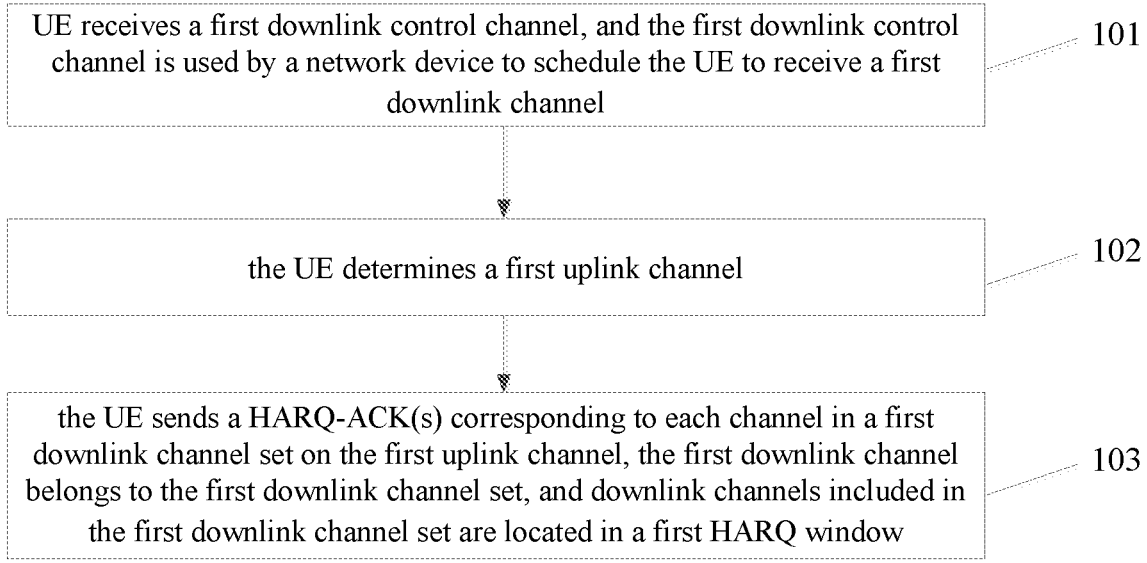
FIG. 1 is a flowchart of a process for transmitting a HARQ according to a first embodiment of the present application.

FIG. 1 is a diagram of a process for transmitting a HARQ according to a first embodiment of the present application. The process includes following steps.

Step 101, UE receives a first downlink control channel, and the first downlink control channel is used by a network device to schedule the UE to receive a first downlink channel.

The UE receives the first downlink control channel, such as a first PDCCH, and the first PDCCH includes control information required for receiving the first downlink channel by the UE, for example, the size of time-frequency resources of the first downlink channel, a corresponding HARQ process number, a modulation and coding method, and so on.

After receiving the first downlink channel, the UE sends a HARQ-ACK corresponding to the first downlink channel to the network device on the first uplink channel. The UE sends HARQ-ACKs of all downlink channels corresponding to the first uplink channel in a HARQ window, rather than sends only the HARQ-ACK corresponding to the first downlink channel on the first uplink channel.

If there is only the HARQ-ACK of the first downlink channel in the HARQ window corresponding to the first uplink channel, the UE only sends the HARQ-ACK of the first downlink channel on the first uplink channel.

A timing relationship between data scheduling and the scheduled data transmission in the NR system is flexible, and a timing relationship between downlink data transmission and its corresponding HARQ-ACK is also flexible.

For a specific UE in the NR system, the timing relationship between data scheduling and the scheduled data transmission may be flexible, but the timing relationship between downlink data transmission and its corresponding HARQ-ACK is fixed.

For example, the time difference between downlink data transmission and its corresponding HARQ-ACK is related to a capability supported by the UE. For example, for UE 1, if the capability supported by the UE 1 is that the time difference between the downlink data transmission and its corresponding HARQ-ACK is not greater than $\tau_1$, then the timing difference between the downlink data transmission of the UE 1 and its corresponding HARQ-ACK is $\tau_1$. For UE 2, if the capability supported by the UE 2 is that the time difference between the downlink data transmission and its corresponding HARQ-ACK is not greater than $\tau_2$, then the timing difference between the downlink data transmission of the UE 2 and its corresponding HARQ-ACK is $\tau_2$.

Alternatively, the time difference between the downlink data transmission and its corresponding HARQ-ACK is configured for the UE by the network device through high-layer signaling or through random access response information. In both cases, it can be considered that the timing relationship between the downlink data transmission and its corresponding HARQ-ACK is fixed.

Figure 2:
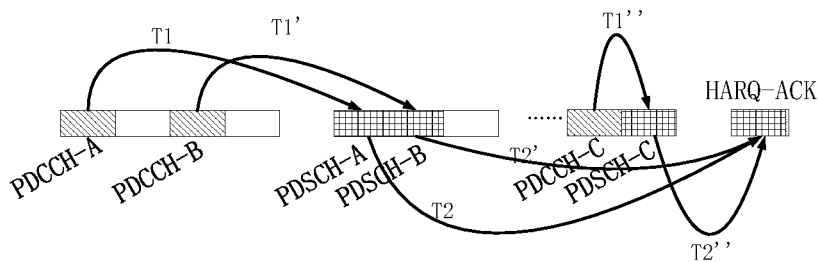
FIG. 2 is a diagram of a case in which a timing relationship between data scheduling and the scheduled data transmission, and a timing relationship between the data transmission and its corresponding HARQ-ACK are both flexible.

FIG. 2 is a diagram of a case in which a timing relationship between data scheduling and the scheduled data transmission, and a timing relationship between the data transmission and its corresponding HARQ-ACK are both flexible.

As shown in FIG. 2, the time difference between PDCCH-A and its corresponding indicated PDSCH-A is T1, and the time difference between PDSCH-A and its corresponding HARQ-ACK is T2; the time difference between PDCCH-B and its corresponding indicated PDSCH-B is T1', and the time difference between PDSCH-B and its corresponding HARQ-ACK is T2'; the time difference between PDCCH-C and its corresponding indicated PDSCH-C is T1", and the time difference between PDSCH-C and its corresponding HARQ-ACK is T2".

According to the respective indications of PDCCH-A, PDCCH-B and PDCCH-C, the UE sends HARQ-ACKs respectively corresponding to PDSCH-A, PDSCH-B and PDSCH-C at the same time.

Before sending the HARQ-ACKs on the uplink channel, the UE needs to perform channel coding and modulation for the to-be-sent HARQ-ACK codebook.

If the HARQ window corresponding to the uplink channel is not defined, the UE cannot determine when to start channel coding for the to-be-sent HARQ-ACK codebook.

As shown in FIG. 2, after receiving PDSCH-B, the UE cannot determine whether there is the HARQ-ACK corresponding to PDSCH-C that needs to be sent on the same uplink channel subsequently, and also cannot determine when to start channel coding and modulation for the HARQ-ACK codebook to be sent on the same uplink channel.

If the UE can determine the HARQ window corresponding to the first uplink channel, after determining the HARQ-ACK codebook corresponding to the first downlink channel set in the HARQ window, the UE may perform channel coding and modulation for the HARQ-ACK codebook, so as to send the HARQ-ACK on the first uplink channel, which facilitates the network device to schedule downlink data.

Step 102, the UE determines a first uplink channel.

Step 103, the UE sends HARQ-ACK(s) corresponding to each channel in a first downlink channel set on the first uplink channel, the first downlink channel belongs to the first downlink channel set, and downlink channels included in the first downlink channel set are located in a first HARQ window.

The downlink channels corresponding to the HARQ-ACK(s) sent on the first uplink channel are all located in the first HARQ window, so that the UE can determine the range of the downlink channels corresponding to the HARQ-ACK(s) sent on the first uplink channel and determine a process before sending the HARQ-ACK(s).

Specifically, a time difference between a first reference downlink channel in the first HARQ window and the first uplink channel is equal to a first threshold, a time difference between a second reference downlink channel in the first HARQ window and the first uplink channel is equal to a second threshold, the first threshold and the second threshold are respectively a maximum value and a minimum value of duration supported by first timing information in the first downlink control channel, a start time occasion of the first reference downlink channel is a start time occasion of the first HARQ window, and an end time occasion of the second reference downlink channel is an end time occasion of the first HARQ window.

As described above, the first downlink control channel is used to indicate the UE to receive the first downlink channel. The first downlink control channel includes the first timing information for indicating the time difference between the first downlink channel and its corresponding feedback channel of the HARQ-ACK.

A time difference between the earliest downlink channel corresponding to the HARQ-ACK sent by the UE on the first uplink channel and the first uplink channel is the first threshold, and a time difference between the latest downlink channel corresponding to the HARQ-ACK and the first uplink channel is the second threshold.

The first threshold and the second threshold are respectively a maximum value and a minimum value of duration supported by first timing information in the first downlink control channel. For example, the first uplink channel locates on Slot #n, and the first timing information in the first downlink control channel is carried with 2 bits. The information of the first timing information and the indicated time difference between the first downlink channel and the first uplink channel is shown in Table 2.

That is, the maximum value of the duration supported by the first timing information is 6 slots, and the minimum value of the duration supported by the first timing information is 3 slots. Then the range of the first HARQ window is a duration from Slot #n−6 to Slot #n−3 prior to Slot #n. A start time occasion of the first HARQ window is a start time occasion of Slot #n−6, and an end time occasion of the first HARQ window is an end time occasion of Slot #n−3. Each uplink channel has a corresponding HARQ window.

TABLE 2

| first timing information | time difference (X slot) between the first downlink channel and the first uplink channel |
|---|---|
| 00 | X = 3 |
| 01 | X = 4 |
| 10 | X = 5 |
| 11 | X = 6 |

Figure 3:
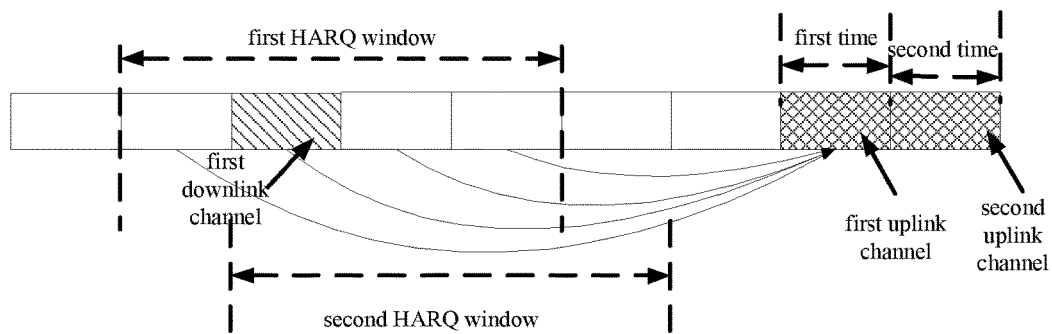
FIG. 3 is a diagram of a relationship between uplink and downlink channels and HARQ windows.

FIG. 3 is a diagram of a relationship between uplink and downlink channels and HARQ windows.

In FIG. 3, a first uplink channel corresponds to a first HARQ window, and a second uplink channel corresponds to a second HARQ window. The first uplink channel locates on Slot #n, referred to a first time, and the second uplink channel locates on Slot #n+1, referred to a second time.

The range of the first HARQ window is a duration from Slot #n−6 to Slot #n−3, and the range of the second HARQ window is a duration from Slot #n−1−6 to Slot #n−1−3 prior to Slot #n+1. That is, HARQ windows corresponding to different uplink channels may have an overlapping portion, and one downlink channel may also be located in two or more HARQ windows.

If the time period of one channel is the same as that of another channel, a time difference between the two channels calculated according to the start time occasions of the two channels is the same as that calculated according to the end time occasions of the two channels. However, if the time period of one channel is different from that of another channel, the time difference between the two channels calculated according to the start time occasions of the two channels is different from that calculated according to the end time occasions of the two channels.

If the time period of the first uplink channel is the same as the time period of the downlink channel used to send downlink data, the time difference between the first reference downlink channel in the first HARQ window and the first uplink channel is equal to the first threshold, the time difference between the second reference downlink channel in the first HARQ window and the first uplink channel is equal to the second threshold.

The start time occasion of the first reference downlink channel is the start time occasion of the first HARQ window, and the end time occasion of the second reference downlink channel is the end time occasion of the first HARQ window. The first reference downlink channel and the second reference downlink channel are both channels that can be used by the network device to send downlink data to the UE.

In a radio communication system, taking the NR system as an example, the time period of a downlink channel and the time period of an uplink channel may be different. For example, the time period of the first uplink channel is one slot. As an example, one slot includes 14 symbols, and the time period of the downlink channel used to send downlink data may be one slot, multiple slots, or some symbols within one slot.

In this way, the time difference between the first uplink channel and the downlink channel calculated according to the start time occasions of the two channels is different from that calculated according to the end time occasions of the two channels. For example, the time of the first uplink channel is Slot #n, and the time period of the downlink channel is the $8^{th}$~$14^{th}$ symbols within Slot #n−k. Then, the time difference between the start time occasion of the first uplink channel and the start time occasion of the downlink channel is a time period of k slots plus 7 symbols, and the time difference between the end time occasion of the first uplink channel and the end time occasion of the downlink channel is k slots.

Therefore, in the NR system, the start time occasion of the first HARQ window is determined by the time of the first uplink channel and the first threshold, and the end time occasion of the first HARQ window is determined by the time of the first uplink channel and the second threshold.

The start time occasion of the first reference downlink channel is the start time occasion of the first HARQ window, and the end time occasion of the second reference downlink channel is the end time occasion of the first HARQ window. Herein, suppose the time difference between the first reference downlink channel and the first uplink channel is the first threshold, and the time difference between the second reference downlink channel and the first uplink channel is the second threshold. The first reference downlink channel and the second reference downlink channel are only used to identify the range of the first HARQ window, but are uncertainly used by the network device to transmit downlink data.

For example, if the time period of the downlink channel used for downlink data transmission is less than the time period of the first uplink channel, the time period of the first reference downlink channel and the time period of the second reference downlink channel may include the time period of multiple downlink channels respectively.

Figure 4A:
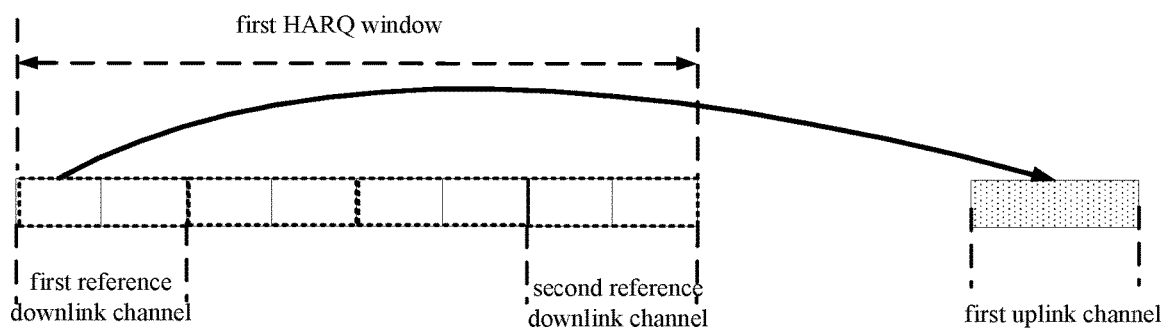
FIG. 4(a) is a diagram of one relationship between a HARQ window and reference downlink channels.

FIG. 4(a) is a diagram of one relationship between a HARQ window and reference downlink channels.

As shown in FIG. 4(a), the time period of the first uplink channel is one UL slot. The time period of the first reference downlink channel and the time period of the second reference downlink channel are also as one UL slot respectively. The time period of the downlink channel used for downlink data transmission is as half of one UL slot. That is, the time period of the downlink channel that can be used for downlink data transmission by the network device is as half of the time period of the first uplink channel. The time period of the first reference downlink channel and the time period of the second reference downlink channel respectively include the time period of two downlink channels.

Figure 4B:
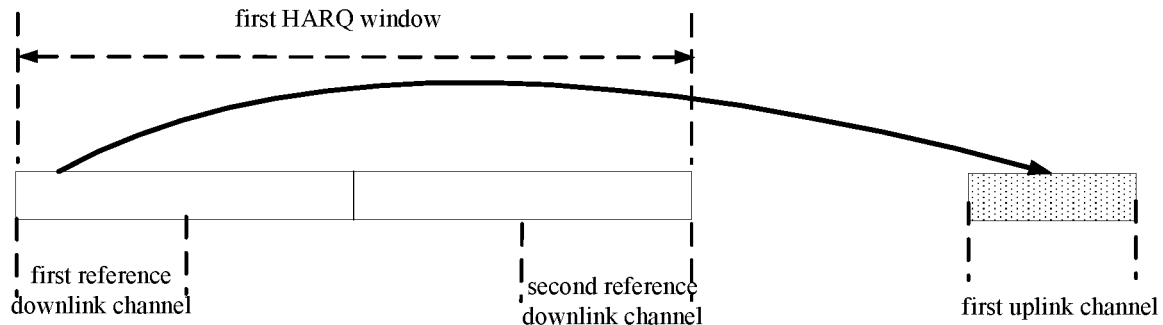
FIG. 4(b) is a diagram of another relationship between a HARQ window and reference downlink channels.

FIG. 4(b) is a diagram of another relationship between a HARQ windows and reference downlink channels.

As shown in FIG. 4(b), the time period of the first uplink channel is one UL slot. The time period of the first reference downlink channel and the time period of the second reference downlink channel are also as one UL slot respectively. The time period of the downlink channel used for downlink data transmission is as two UL slots. That is, the time period of the downlink channel that can be used for downlink data transmission by the network device is as twice the time period of the first uplink channel. The time period of the first reference downlink channel and the time period of the second reference downlink channel respectively include the time period of half of the downlink channel.

In the foregoing, the start time occasion and end time occasion of the first HARQ window are determined according to the time of the first uplink channel, the first threshold and the second threshold. That is, the time period of the first reference downlink channel and the time period of the second reference downlink channel are both the same as the time period of the first uplink channel. In the NR system, the time period of the first uplink channel used by the UE to send uplink control information may also be flexible.

For example, one slot includes 14 symbols, and the first uplink channel occupies only some of the 14 symbols. If the start time occasion and end time occasion of the first HARQ window are determined according to the time of the first uplink channel, the first threshold and the second threshold with the above manner, the start time occasion and end time occasion of the first HARQ window may not be boundaries of one slot. The start position and end position of the first HARQ window cannot be aligned to the boundaries of the downlink channel actually used for downlink data transmission.

If the UE determines the first HARQ window according to this manner, it is ambiguous whether the HARQ-ACK corresponding to the downlink channel at the boundary of the first HARQ window is transmitted on the first uplink channel.

Therefore, in this embodiment, the UE may determine the start time occasion and end time occasion of the first HARQ window according to the time of a first reference uplink channel, the first threshold and the second threshold. The first reference uplink channel corresponds to the first uplink channel. The first reference downlink channel may correspond to exactly one uplink channel used for uplink data transmission, or may correspond to multiple uplink channels used for uplink data transmission, or may be part of one uplink channel used for uplink data transmission.

Figure 5:
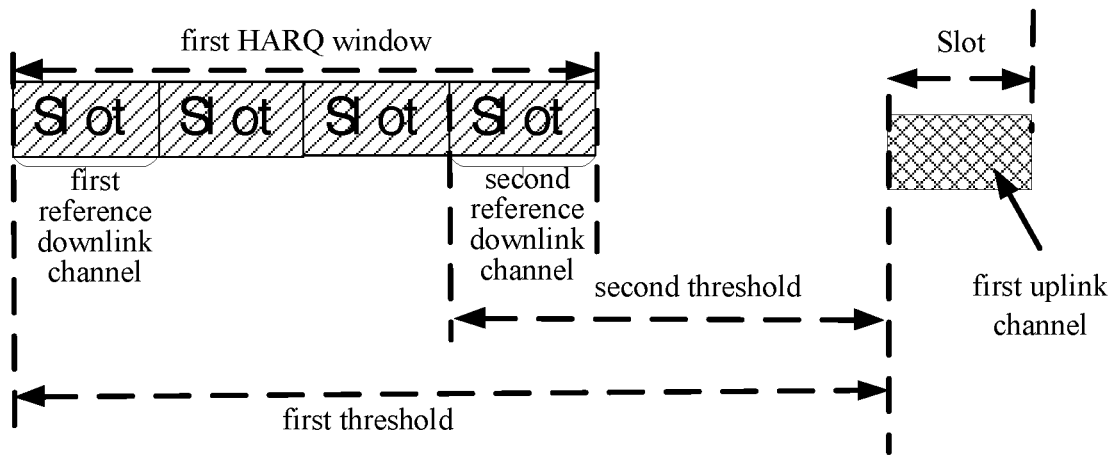
FIG. 5 is a diagram of a relationship between a first reference downlink channel and an uplink channel according to embodiments of the present application.

FIG. 5 is a diagram of a relationship between a first reference downlink channel and an uplink channel used for uplink data transmission according to embodiments of the present application.

In FIG. 5, as an example, the time period of the first reference downlink channel corresponds to exactly the time period of one uplink channel used for uplink data transmission.

The time period of the first reference downlink channel and the period of the second reference downlink channel are both the same as the time period of the first reference uplink channel, and the first reference uplink channel corresponds to the first uplink channel.

The first reference uplink channel overlaps the first uplink channel in time.

In this embodiment, the time difference between the first reference downlink channel in the first HARQ window and the first uplink channel is equal to the first threshold, and the time difference between the second reference downlink channel in the first HARQ window and the first uplink channel is equal to the second threshold.

The time difference between the first reference downlink channel and the first uplink channel is a time difference between the start time occasion of the first reference downlink channel and the start time occasion of the first uplink channel, or a time difference between the end time occasion of the first reference downlink channel and the end time occasion of the first uplink channel.

If the time period of the first uplink channel is different from the time period of the first reference uplink channel, the time difference between the first reference downlink channel and the first uplink channel refers to a time difference between the start time occasion of the first reference downlink channel and the start time occasion of the first reference uplink channel, or a time difference between the end time occasion of the first reference downlink channel and the end time occasion of the first reference uplink channel.

Similarly, the time difference between the second reference downlink channel and the first uplink channel refers to a time difference between the start time occasion of the second reference downlink channel and the start time occasion of the first reference uplink channel, or a time difference between the end time occasion of the second reference downlink channel and the end time occasion of the first reference uplink channel.

Figure 6:
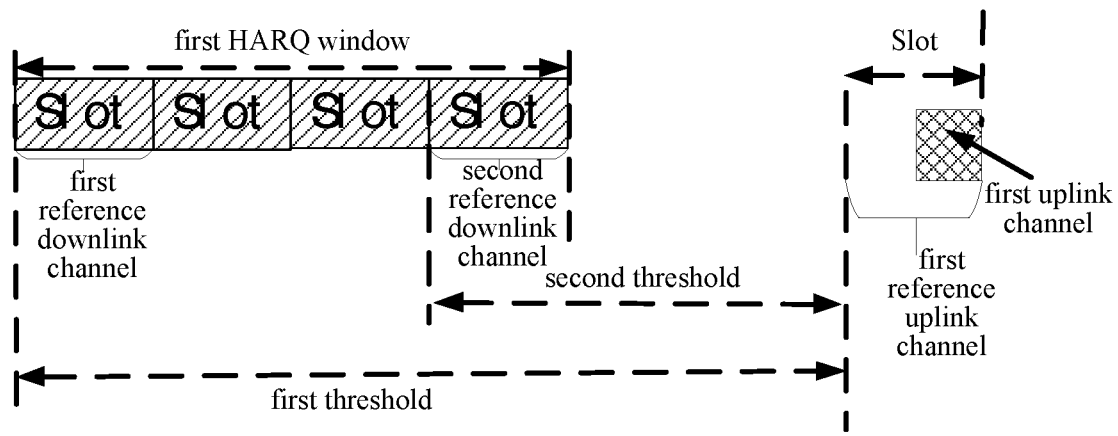
FIG. 6 is a diagram of a case in which the time period of a first uplink channel is part of symbols within one slot.

FIG. 6 is a diagram of a case in which the time period of the first uplink channel is part of symbols within one slot. In this case, the first reference uplink channel is an uplink channel which has a time period of one slot and overlaps the first uplink channel in time. The first reference uplink channel is only used to identify the duration of the first HARQ window together with the first threshold and the second threshold, but is uncertainly used for uplink data transmission by the UE.

Figure 7:
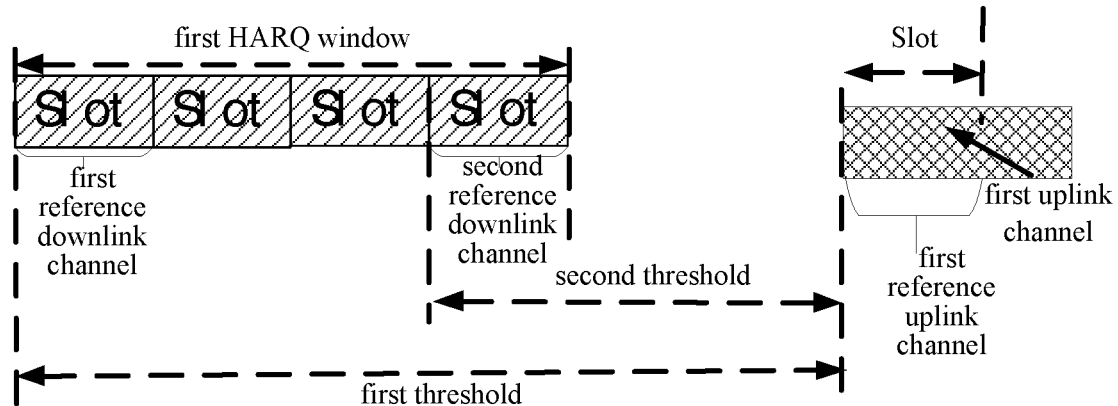
FIG. 7 is a diagram of a case in which the time period of a first uplink channel is greater than one slot.

FIG. 7 is a diagram of a case in which the time period of the first uplink channel is greater than one slot. In this case, the time period of the first uplink channel is 2 slots. The first channel which has a time period of one slot and overlaps the first uplink channel in time is the first reference uplink channel. The first reference uplink channel is only used to identify the duration of the first HARQ window together with the first threshold and the second threshold, but is uncertainly used for uplink data transmission by the UE.

The time period of the first reference uplink channel is preset. For example, the preset time period of the first reference uplink channel is one slot. In FIG. 6, the time period of the first uplink channel is part of symbols within one slot, and the first reference uplink channel is the slot in which the first uplink channel is located. In FIG. 7, the time period of the first uplink channel is greater than one slot, and the first reference uplink channel is the first slot included in the first uplink channel.

According to the above, the start time occasion of the first reference downlink channel is the start time occasion of the first HARQ window, and the end time occasion of the second reference downlink channel is the end time occasion of the first HARQ window. The time period of the first reference downlink channel and the time period of the second reference downlink channel include P downlink channels, where P is an integer greater than or equal to 1. The P downlink channels may be used by the network device to send downlink data to the UE.

A time difference between the first reference downlink channel corresponding to the earliest channel among the P downlink channels and the first uplink channel is equal to the first threshold, and a time difference between the second reference downlink channel corresponding to the latest channel among the P downlink channels and the first uplink channels is equal to the second threshold. The first reference downlink channel and the second reference downlink channel are only used to identify the duration of the first HARQ window, but are uncertainly used for downlink data transmission by the network device.

For example, if the time period of the downlink channel used for downlink data transmission is smaller than the time period of the first uplink channel, the time period of the first reference downlink channel and the time period of the second reference downlink channel may respectively include time periods of multiple downlink channels. If the time period of the earliest channel among the P downlink channels is smaller than the time period of the first uplink channel, the first reference downlink channel corresponding to the earliest channel includes at least one downlink channel for downlink data transmission. The time difference between the first reference downlink channel and the first uplink channel is the first threshold, referring to the case shown in FIG. 4(a).

Similarly, if the time period of the earliest channel among the P downlink channels is greater than the time period of the first uplink channel, the start time occasion of the first reference downlink channel corresponding to the earliest channel is the start time occasion of the first downlink channel, the time period of the first reference downlink channel corresponding to the earliest channel is part of the time period of the first downlink channel, and the time difference between the first reference downlink channel and the first uplink channel is the first threshold, referring to the case shown in FIG. 4(*b*).

That is, the first HARQ window includes P downlink channels, where P is an integer greater than or equal to 1. The time difference between the first reference downlink channel corresponding to the earliest channel among the P downlink channels and the first uplink channel is equal to the first threshold, and the time difference between the second reference downlink channel corresponding to the latest channel among the P downlink channels and the first uplink channel is equal to the second threshold. The first threshold and the second threshold are respectively a maximum value and a minimum value of the duration supported by the first timing information in the first downlink control channel.

The time difference between the downlink data transmission and its corresponding HARQ-ACK may be fixed. For example, the time difference is related to the capability supported by the UE, or is configured for the UE by the network device through high-layer signaling or through random access response information. In these cases, it can be considered that the timing relationship between the downlink data transmission and its corresponding HARQ-ACK is fixed.

Then, the HARQ window corresponding to the HARQ-ACK sent by the UE on the first uplink channel is the time period of the reference downlink channel corresponding to the first uplink channel, wherein the time difference between the reference downlink channel and the first uplink channel satisfies the fixed time difference.

For example, the time difference between the downlink data transmission and its corresponding HARQ-ACK is σ, then the time difference between the first reference downlink channel in the first HARQ window and the first uplink channel is equal to σ. The start time occasion of the first reference downlink channel is the start time occasion of the first HARQ window, and the end time occasion of the first reference downlink channel is the end time occasion of the first HARQ window. The time period of the first reference downlink channel may be greater or smaller than the time period of the downlink channel sent by the network device to the UE. The first reference downlink channel is only used to identify the duration of the first HARQ window, but is uncertainly used for downlink data transmission by the network device.

In this embodiment, the UE may determine the start time occasion and end time occasion of the first HARQ window according to the time of the first reference uplink channel and the time difference between the downlink data transmission and its corresponding HARQ-ACK. The first reference uplink channel corresponds to the first uplink channel. The first reference downlink channel may correspond to exactly one uplink channel used for uplink data transmission, or may correspond to multiple uplink channels used for uplink data transmission, or may be part of one uplink channel used for uplink data transmission.

In addition, the parameter configuration in an OFDM system includes the size of subcarrier interval and the size of cyclic prefix. A set of OFDM parameter configurations is called numerology. Unlike the LTE system which supports only one type of numerology, the NR system supports at least six types of numerologies shown in a table below. The numerology used by the NR system is notified by the network device to the UE through high-layer signaling.

The duration of one radio frame is 10 ms, which includes 10 subframes. For a specific numerology configuration μ, slots $n_s^\mu$ in one subframe are recorded as $n_s^\mu \in \{0, \ldots, N_{slot}^{subframe,\mu}-1\}$ in a chronological order, where $N_{slot}^{subframe,\mu}$ is the number of slots included in one subframe, and this parameter is also related to the numerology configuration μ. In the NR system, if the UE supports carrier aggregation, the network device may notify the UE of the numerology used by each component carrier (CC) for the carrier aggregation.

In this way, in a carrier aggregation scenario of the NR system, the numerology of the PCell and the numerology of the SCell may be different in a cell group. The Physical Uplink Control Channel (PUCCH) of the UE is always transmitted on the PCell in the cell group. When the network device indicates the timing relationship for sending the HARQ-ACK for the UE, the time granularity of a first time indication is based on the time granularity of numerology corresponding to a carrier where the PUCCH is located.

Figure 8:
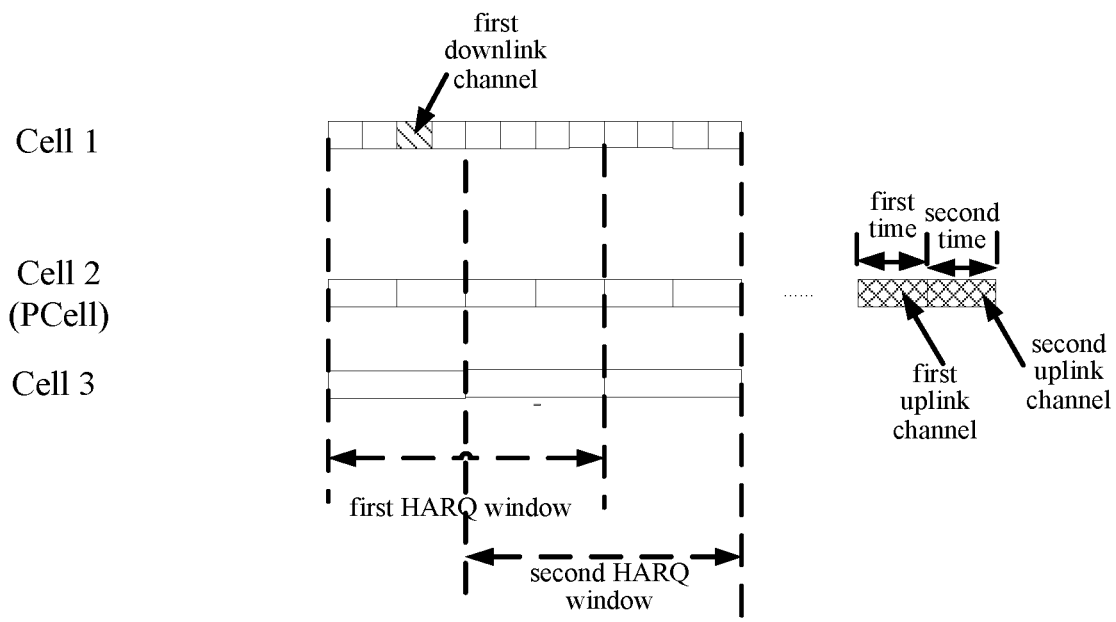
FIG. 8 is a diagram of a relationship between uplink and downlink channels and HARQ windows in a carrier aggregation scenario according to embodiments of the present application.

FIG. 8 is a diagram of a relationship between uplink and downlink channels and HARQ windows in a carrier aggregation scenario according to embodiments of the present application.

In FIG. 8, Cell 2 is the PCell. In a numerology configuration corresponding to the Cell 2, one subframe includes 2 slots, and each slot includes 14 symbols. In a numerology configuration corresponding to Cell 1, one subframe includes 4 slots, and each slot includes 14 symbols. In a numerology configuration corresponding to Cell 3, one subframe includes one slot, and each slot includes 14 symbols.

It can be seen that the time period of one slot corresponding to one cell is different from the time period of one slot corresponding to another cell. However, HARQ-ACKs corresponding to the uplink and downlink data of all cells are transmitted on the PCell.

The time period of channels for uplink and downlink data transmission in each cell is one slot in an example. Then, a downlink control channel corresponding to the Cell 1 indicates that the time period of the downlink channel for downlink data transmission is one slot, and the time period of this slot corresponds to the Cell 1. However, when the downlink control channel indicates a time difference between the downlink channel and its corresponding uplink channel used for the HARQ-ACK, the unit of the time difference is the time period of one slot corresponding to the numerology of the Cell 2. That is, the first time indication in Downlink Control Information (DCI) used to schedule the downlink channel in the first HARQ window is based on the time granularity corresponding to the numerology of the PCell.

Accordingly, the start time occasion and end time occasion of the first HARQ window that are determined by the UE according to the time of the first uplink channel, the first threshold and the second threshold are applicable to all carriers for carrier aggregation. That is, the downlink channels included in the first downlink channel set belong to at least two cells, the first reference downlink channel and the second reference downlink channel are located in a first cell, and the first cell is a cell where the first uplink channel is located.

As shown in FIG. 8, the first HARQ window corresponding to the first uplink channel is determined according to the first uplink channel, the first threshold and the second threshold. The first HARQ window includes a downlink channel with 8 slots in the Cell 1, a downlink channel with 4 slots in the Cell 2, and a downlink channel with 2 slots in the Cell 3.

In the NR system, one downlink channel may include at least one Transmission Block (TB), and the UE needs to feed back HARQ-ACK information for each TB.

Further, when coding one TB, the network device may first divide the TB into a number of Code Blocks (CBs). Afterwards, each CB is coded separately after being added by Cyclic Redundancy Check (CRC), and then is cascaded and coded. CBs in one TB may be divided into several Code Block Groups (CBGs). The UE may need to feed back a HARQ-ACK corresponding to each CBG. That is, the size of the HARQ-ACK codebook sent by the UE is not only related to the number of downlink channels included in the corresponding HARQ window, but also related to the number of TBs transmitted in the downlink channels and whether the HARQ-ACK is fed back according to the CBG.

In this embodiment, only those factors related to the size of the HARQ-ACK codebook and the number of downlink channels included in the HARQ window are described. It is not specifically explained that one downlink channel feeds back HARQ-ACKs of multiple TBs or HARQ-ACKs of multiple CBGs.

According to the above method, the UE may determine the first HARQ window and the downlink channels included in the first HARQ window.

Specifically, the UE receives a first downlink control channel, and the first downlink control channel is used by a network device to schedule the UE to receive a first downlink channel.

The UE determines a first uplink channel.

The UE sends a HARQ-ACK corresponding to each channel in a first downlink channel set on the first uplink channel, the first downlink channel belongs to the first downlink channel set, and downlink channels included in the first downlink channel set are located in a first HARQ window.

A time difference between a first reference downlink channel in the first HARQ window and the first uplink channel is equal to a first threshold, a time difference between a second reference downlink channel in the first HARQ window and the first uplink channel is equal to a second threshold, the first threshold and the second threshold are respectively a maximum value and a minimum value of duration supported by first timing information in the first downlink control channel, a start time occasion of the first reference downlink channel is a start time occasion of the first HARQ window, and an end time occasion of the second reference downlink channel is an end time occasion of the first HARQ window.

Alternatively, the time difference between the first reference downlink channel in the first HARQ window and the first uplink channel is equal to a first reference value, where the first reference value is a time difference between downlink data transmission used by the UE and its corresponding HARQ-ACK; the start time occasion of the first reference downlink channel is the start time occasion of the first HARQ window, and the end time occasion of the second reference downlink channel is the end time occasion of the first HARQ window.

Alternatively, the UE receives a first downlink control channel, and the first downlink control channel is used by a network device to schedule the UE to receive a first downlink channel;

the UE determines a first uplink channel; and the UE sends a HARQ-ACK corresponding to each channel in a first downlink channel set on the first uplink channel.

The size of the HARQ-ACK codebook sent by the UE on the first uplink channel may be determined with two possible methods.

In one method, the size of the HARQ-ACK codebook may be determined with a static manner. That is, the first downlink channel set corresponding to the HARQ-ACKs sent by the UE on the first uplink channel includes all downlink channels in the first HARQ window. If the UE does not receive downlink data on some downlink channels of the first downlink channel set, the UE feeds back NACKs in the HARQ-ACK codebook corresponding to those downlink channels.

In the other method, the size of the HARQ-ACK codebook may be determined with a dynamic manner. The first downlink channel set includes N downlink channels in the first HARQ window. A downlink control channel corresponding to the $M^{th}$ downlink channel among the N downlink channels includes the first timing information, and the first timing information is used to indicate to send HARQ-ACK corresponding to the $M^{th}$ downlink channel within the time period of the first uplink channel, where N is an integer greater than or equal to 1, and M is an integer not greater than N.

If the timing relationship between the downlink data transmission and its corresponding HARQ-ACK is fixed, when the UE determines the size of the HARQ-ACK codebook with a dynamic manner, the first downlink channel set is composed of N downlink channels in the first HARQ window, and the time difference between each of the N downlink channels and the first uplink channel satisfies the time difference between the downlink data transmission used by the UE and its corresponding HARQ-ACK.

That is to say, a channel belongs to the first downlink channel set only when it is located in the first HARQ window and its corresponding HARQ-ACK is indicated to be sent at the time when the first uplink channel locates. The HARQ-ACK codebook sent by the UE on the first uplink channel includes the HARQ-ACK corresponding to each channel in the first downlink channel set.

When the size of the HARQ-ACK codebook is determined with the dynamic manner, the UE does not need to send a HARQ-ACK corresponding to a downlink channel from which no downlink data is received. Accordingly, the transmission efficiency of HARQ feedback information becomes high. However, because the transmission of the PDCCH corresponding to the PDSCH for downlink data is not 100% reliable, the UE may lose some DCI, which results in that the size of the HARQ-ACK codebook determined by the UE is different from that determined by the network device, thereby resulting in a higher error rate of the HARQ-ACK.

In order to avoid such a problem, the downlink control channels respectively corresponding to the N downlink channels in the first HARQ window that are included in the first downlink channel set all include a counter Downlink Assignment Index (DAI). The counter DAI is used to indicate a downlink channel index counter value.

In an embodiment, the DAI may include a Counter DAI and/or a Total DAI. The Counter DAI corresponds to a downlink channel index counter value, which is used to notify the UE of the sequence number of downlink channel currently scheduled in the HARQ window. The Total DAI is used to notify the UE of the number downlink channels for transmission in the HARQ window before the current subframe. In this way, it is helpful for the UE to detect whether some downlink DCI is lost, and to determine the number of bits of HARQ-ACKs to be fed back.

For example, the network device sends downlink data to the UE on 5 downlink channels in the first HARQ window. The downlink control channel corresponding to each of the 5 downlink channels includes a counter DAI, which is used to indicate a downlink channel index counter value. Take a DAI field having 2-bit information length as an example, the DAI fields in the downlink control channels respectively corresponding to the 5 downlink channels are 00, 01, 10, 11 and 00 respectively, and their corresponding downlink channel index counter values are 1, 2, 3, 4 and 5 respectively.

If the UE does not receive the second downlink channel, the DAI fields in the downlink control channels respectively corresponding to the received four downlink channels are 00, 10, 11 and 00, respectively. According to the DAI indexes in the received downlink control channels, the UE may determine that one downlink channel scheduled by the network device is lost, where the lost downlink channel is between a downlink channel corresponding to the downlink control channel with the DAI field of 00 and a downlink channel corresponding to the downlink control channel with the DAI field of 10. The UE may determine through the Total DAI and the Counter DAI whether the last few downlink channels scheduled by the network device are lost.

In this way, the HARQ-ACK codebook fed back by the UE includes a HARQ-ACK corresponding to the lost downlink channel. The UE may set the HARQ-ACK corresponding to the lost downlink channel to NACK. Thus, if the HARQ-ACK codebook is determined with this manner, the difference between the size of the HARQ-ACK codebook determined by the UE and that determined by the network device, which is caused by the unreliability of the transmission of the PDCCH corresponding to the PDSCH for downlink data, can be avoided to some degree, and thus the high error rate of HARQ-ACK can be avoided. In the LTE system, the numerology on each carrier is the same, and the Counter DAIs corresponding to the PDSCHs in the HARQ window are arranged in an order of frequency domain first and time domain later.

In the NR system, the timing relationship between data scheduling and the scheduled data transmission is flexible, and the network device indicates a timing relationship between data scheduling and the scheduled data transmission to the UE through second timing information in the DCI.

In this embodiment, the UE sends the HARQ-ACK corresponding to the first downlink channel on the first uplink channel, and the first downlink channel is scheduled by the network device to the UE through the first downlink control channel.

The first downlink control channel includes second timing information indicating the timing relationship between the first downlink control channel and the first downlink channel. For example, the second timing information is indicated with 2 bits. The meaning of the second timing information and the indicated time difference between the first downlink control channel and the first downlink channel is shown in Table 3 below, which indicates that when the UE receives the first downlink channel. After the UE receives the first downlink channel, the HARQ-ACK corresponding to the first downlink channel may be sent by the UE after 3, 4, 5 or 6 slots.

TABLE 3

| second timing information | time difference (Y) between the first downlink control channel and the first downlink channel |
|---|---|
| 00 | Y = 0 |
| 01 | Y = 1 |
| 10 | Y = 2 |
| 11 | Y = 3 |

In this embodiment, the UE sends the HARQ-ACK corresponding to each channel in the first downlink channel set on the first uplink channel, and the first downlink channel set includes downlink channels in the first HARQ window. If the first downlink channel set is a set of downlink channels indicated by a first downlink control channel set, the first timing information of each piece of control information included in the first downlink control channel set indicates the corresponding HARQ-ACK is to be sent at the time when the first uplink channel locates, and the second timing information of each piece of the control information included in the first downlink control channel set indicates the corresponding downlink channel included in the first downlink channel set. Alternatively, a downlink channel indicated by each piece of the control information included in the first downlink control channel set and the first uplink channel satisfy the fixed timing relationship between the current downlink data of the UE and the HARQ-ACK, and the second timing information of each piece of the control information included in the first downlink control channel set corresponds to a downlink channel in the first downlink channel set.

If the first downlink channel set is a set of downlink channels indicated by the first downlink control channel set, that is, the HARQ-ACK codebook sent by the UE on the first uplink channel is determined with the dynamic manner, the order of DAIs of control channels in the first downlink control channel set should be considered.

Generally, the order of DAIs of control channels in the first downlink control channel set corresponds to the order of HARQ-ACK information on the first uplink channel.

For example, the size of the HARQ-ACK codebook sent on the first uplink channel is $o^{ACK}$, and a HARQ-ACK codebook is $\tilde{o}_0^{ACK}, \tilde{o}_1^{ACK}, \ldots, \tilde{o}_{o^{ACK}-1}^{ACK}$, where $\tilde{o}_0^{ACK}$ is a HARQ-ACK corresponding to a downlink channel indicated by a downlink control channel which has a downlink channel index counter value of 1 and is indicated by the Counter DAI of DCI in the first downlink control channel set, $\tilde{o}_1^{ACK}$ is a HARQ-ACK corresponding to a downlink channel indicated by a downlink control channel which has a downlink channel index counter value of 2 and is indicated by the Counter DAI of DCI, . . . , $\tilde{o}_{o^{ACK}-1}^{ACK}$ is a HARQ-ACK corresponding to a downlink channel indicated by a downlink control channel which has a downlink channel index counter value of $o^{ACK}$ and is indicated by the Counter DAI of DCI in the first downlink control channel set.

In the NR system, the timing relationship between data scheduling and the scheduled data transmission is flexible, and the network device indicates the timing relationship between data scheduling and the scheduled data transmission to the UE through second timing information in the DCI.

If the order of DAIs of control channels in the first downlink control channel set considers the acquisition order of the corresponding HARQ-ACK information on the first uplink channel, the transmission speed of HARQ-ACKs can be accelerated, thereby improving the transmission efficiency of the system.

Generally, the value of a Counter DAI in a downlink control channel corresponding to the downlink channel that is sent by the network device earlier should be as small as possible.

Figure 9:
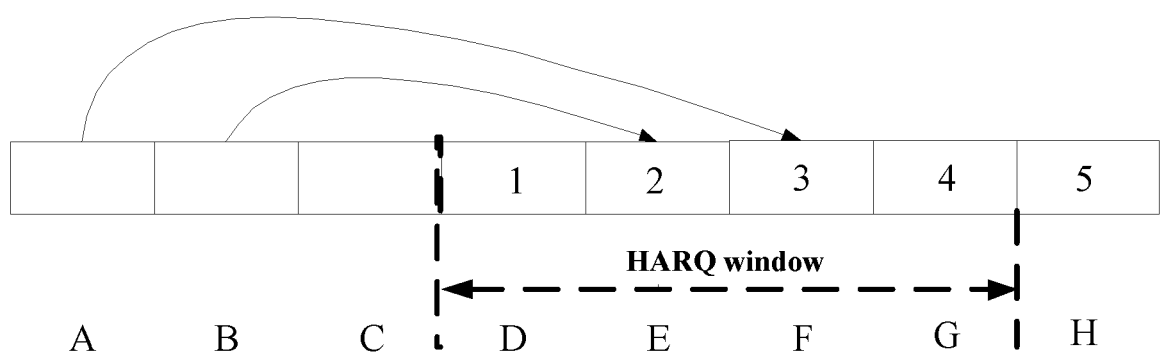
FIG. 9 is a diagram of a relationship between a HARQ time window and DAIs.

FIG. 9 is a diagram of a relationship between a HARQ window and DAIs. The network device sequentially sends the second and third downlink channels to the UE, and the UE first receives control information for detecting the second downlink channel and then receives control information for detecting the third downlink channel. Accordingly, the UE first obtains a HARQ-ACK for the data of the second downlink channel, and then obtains a HARQ-ACK for the data of the third downlink channel.

In the HARQ-ACK codebook, the UE puts the HARQ-ACK for the data of the second downlink channel prior to the HARQ-ACK for the data of the third downlink channel, which is beneficial for the UE to code and modulate the HARQ-ACK in advance, thereby improving the transmission efficiency of the system. However, when the timing relationship between data scheduling and the scheduled data transmission is flexible, it may be difficult in some scenarios to realize that the HARQ-ACK corresponding to the downlink channel sent earlier is prior to the HARQ-ACK corresponding to the downlink channel sent later.

In the example of FIG. 9, a downlink control channel within time unit A schedules the third downlink channel in the HARQ window, and a downlink control channel within time unit B schedules the second downlink channel in the HARQ window. It can be learned that the first, second and third downlink channels are sequentially sent by the network device to the UE, but the UE first receives control information for detecting the first downlink channel, then receives control information for detecting the third downlink channel indicated by the downlink control channel within the time unit A, and finally receives control information for detecting the second downlink channel in the HARQ window that is scheduled within the time unit B by the downlink control channel.

The time unit A is prior to the time unit B. When the network device determines to send downlink control information for the second downlink channel in the HARQ window within the time unit A, it may not be determined that the downlink control channel is to schedule the second downlink channel in the HARQ window within the time unit B. In this way, a downlink channel index counter value corresponding to the DAI in the downlink control information of the third downlink channel sent within the time unit A is smaller than a downlink channel index counter value corresponding to the DAI in the downlink control information of the second downlink channel sent within the time unit B.

That is, if the sending time occasion of a downlink control channel corresponding to the $R_1^{th}$ downlink channel among the N downlink channels included in the first downlink channel set is earlier than the sending time occasion of a downlink control channel corresponding to the $R_2^{th}$ downlink channel, then a downlink channel index counter value corresponding to the $R_1^{th}$ downlink channel is smaller than a downlink channel index counter value corresponding to the $R_2^{th}$ downlink channel, where both $R_1$ and $R_2$ are integers not greater than N. Correspondingly, in the HARQ-ACK codebook sent by the UE on the first uplink channel, the HARQ-ACK corresponding to the $R_1^{th}$ downlink channel is also prior to the HARQ-ACK corresponding to the $R_2^{th}$ downlink channel. That is, it is difficult for the network device to realize that the downlink channel index counter value of the Counter DAI in the downlink control channel corresponding to the downlink channel sent earlier is smaller.

The UE may perform coding and modulation for the HARQ-ACKs before sending them, without needing to receive and detect all downlink channels in the HARQ window and obtain a codebook of all HARQ-ACKs $\tilde{o}_0^{ACK}$ $\tilde{o}_1^{ACK}, \ldots, \tilde{o}_{o^{ACK}-1}^{ACK}$. On the contrary, the UE may perform coding and modulation for those front bits in the codebook of the HARQ-ACKs obtained first. In this way, the UE may have more flexible processing time for the HARQ-ACK codebook to be fed back.

In addition, when the network device receives and processes the HARQ-ACK codebook on the first uplink channel, during the coding process, the HARQ-ACKs in the front are obtained first, and then the HARQ-ACKs in the back are obtained.

If the front bits in the HARQ-ACK codebook $\tilde{o}_0^{ACK}$ $\tilde{o}_1^{ACK}, \ldots, \tilde{o}_{o^{ACK}-1}^{ACK}$ correspond to downlink channels received and detected earlier by the UE, the network device may obtain the HARQ-ACKs corresponding to these downlink channels earlier, so as to make a judgment earlier for the subsequent scheduling of service data transmitted on these downlink channels. To achieve this purpose, the DAIs in the downlink control channels respectively corresponding to the downlink channels received and detected earlier by the UE should be arranged as small as possible.

That is, if the sending time occasions of downlink control channels corresponding to Q downlink channels among the N downlink channels included in the first downlink channel set are the same, and the end time occasion of the $Q_1^{th}$ downlink channel among the Q downlink channels is earlier than the end time occasion of the $Q_2^{th}$ downlink channel, then a downlink channel index counter value corresponding to the $Q_1^{th}$ downlink channel is smaller than a downlink channel index counter value corresponding to the $Q_2^{th}$ downlink channel, where Q is an integer not greater than N, both $Q_1$ and $Q_2$ are integers not greater than Q.

In a carrier aggregation scenario of the NR system, since numerologies of cells in a cell group are different, the time period of slots under different numerologies are different. For multiple downlink control channels sent within the same time unit, the start time occasions of downlink channels corresponding to them may be the same, but the end time occasions of the downlink channels may be different. Alternatively, the start time occasions of the downlink channels may be different, but the end time occasions of the downlink channels may be the same.

Figure 10:
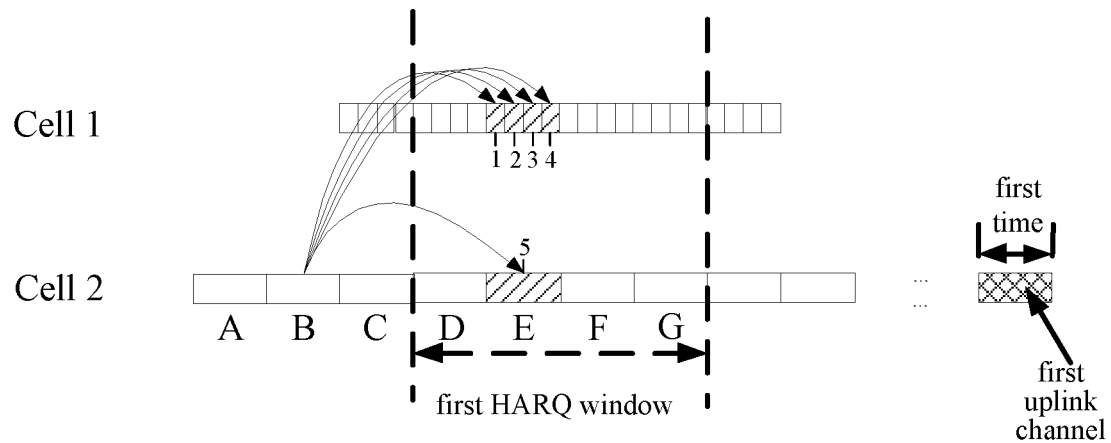
FIG. 10 is a diagram of a case in which the sending time occasions of downlink channels are the same and the end time occasions of the downlink channels are different in a carrier aggregation scenario.

FIG. 10 is a diagram of a case in which the sending time occasions of downlink channels are the same and the end time occasions of the downlink channels are different in a carrier aggregation scenario.

In FIG. 10, there are five downlink control channels in the time unit B respectively for scheduling the first, second, third, fourth and fifth downlink channels in the HARQ window. It can be learned that, the first and fifth downlink channels are sent by the network device to the UE at the same time, but the first downlink channel ends first, and then the fifth downlink channel ends; the start time occasions of the second and third downlink channels are later than that of the fifth downlink channel, but the end time occasions of the second and third downlink channels are earlier than that of the fifth downlink channel; the start time occasion of the fourth downlink channel is later than that of the fifth downlink channel, but the end time occasion of the fourth downlink channel is the same as that of the fifth downlink channel.

The UE first receives and detects the data of the first and fifth downlink channels, but the completion of the detection for the first downlink channel is earlier than that of the detection for the fifth downlink channel. Afterwards, the UE receives and detects the second and third downlink channels, and the completion of the detection for the second and third downlink channels is also earlier than that of detection for the fifth downlink channel. Then, the UE detects the fourth downlink channel, and the detection for the fourth and fifth downlink channels are completed at the same time.

In this way, the UE may obtain the HARQ-ACKs corresponding to the first, second and third downlink channels in sequence, and then obtain the HARQ-ACKs corresponding to the fourth and fifth downlink channels. In order to make the UE have more flexible processing time for the HARQ-ACK codebook to be fed back, and make the network device earlier obtain the HARQ-ACKs corresponding to downlink channels with earlier sending and receiving time occasions, the front bits in the HARQ-ACK codebook are best to correspond to the downlink channels which are received and detected by the UE earlier. Therefore, a downlink channel index count value of Counter DAI in a downlink control channel corresponding to a downlink channel that the network device stops sending earlier should be as small as possible.

If the sending time occasions of downlink control channels corresponding to W downlink channels among the N downlink channels included in the first downlink channel set are the same, the end time occasion of the $W_1^{th}$ downlink channel among the W downlink channels and the end time occasion of the $W_2^{th}$ downlink channel among the W downlink channels are the same, and an index of a cell where the $W_1^{th}$ downlink channel is located is smaller than an index of a cell where the $W_2^{th}$ downlink channel is located, a counter value corresponding to the $W_1^{th}$ downlink channel is smaller than a downlink channel index counter value corresponding to the $W_2$th downlink channel, where W is an integer not greater than N, and both $W_1$ and $W_2$ are integers not greater than W.

In response to the above problems, the present application provides an arranging rule. For the downlink control channels included in the first downlink control channel set, the Counter DAIs included in them are first arranged according to the sending time occasions of these downlink control channels, and the value of a Counter DAI in a downlink control channel with an earlier sending time occasion is smaller. For downlink control channels with the same sending time occasion, the value of a Counter DAI in a downlink control channel corresponding to a downlink channel with an earlier end time occasion should be as small as possible.

For the downlink control channels with the same sending time occasion, if the end time occasions of the downlink channels corresponding to these downlink control channels are the same, the value of a Counter DAI in a downlink control channel corresponding to a downlink channel with a smaller cell index number is smaller.

Figure 11:
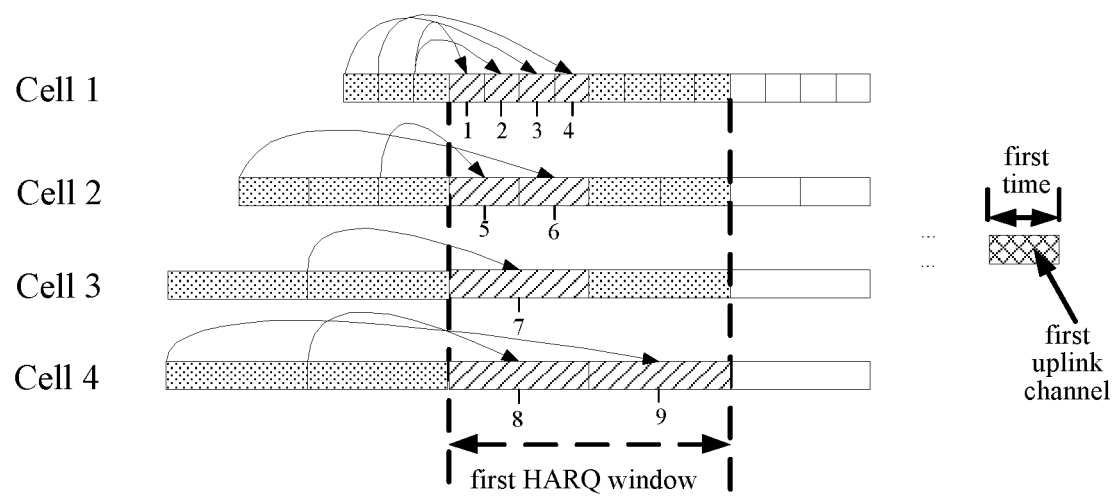
FIG. 11 is a diagram of indications for the receiving and sending time occasions of nine downlink channels according to embodiments of the present application.

FIG. 11 is a diagram of indications for the receiving and sending time occasions of nine downlink channels according to embodiments of the present application.

It can be seen from FIG. 11 that, scheduling information for the $9^{th}$ downlink channel has the earliest sending time occasion, and thus the $9^{th}$ downlink channel is arranged first.

Among the remaining downlink channels, scheduling information for the $6^{th}$ downlink channel has the earliest sending time occasion, and thus the $6^{th}$ downlink channel is arranged secondly.

Then, scheduling information for the $7^{th}$ and $8^{th}$ downlink channels among the remaining downlink channels have the earliest sending time occasion and the end time occasions of them are the same. Because the serving cell index of the $7^{th}$ downlink channel is smaller than that of the $8^{th}$ downlink channel, the $7^{th}$ downlink channel is arranged first, and then the $8^{th}$ downlink channel is arranged.

Among the remaining downlink channels, scheduling information for the $3^{rd}$ downlink channel has the earliest sending time occasion.

After arranging the $3^{rd}$ downlink channel, it is found that scheduling information for the $4^{th}$ and $5^{th}$ downlink channels among the remaining downlink channels have the earliest sending time occasion. Since the end time occasion of the $5^{th}$ downlink channel is earlier than that of the $4^{th}$ downlink channel, the $5^{th}$ downlink channel is arranged first, and then the $4^{th}$ downlink channel is arranged.

After the $4^{th}$ downlink channel is arranged, scheduling information for the $1^{st}$ and $2^{nd}$ downlink channels have the earliest sending time occasion. Since the end time occasion of the $1^{st}$ downlink channel is earlier than that of the $2^{nd}$ downlink channel, the $1^{st}$ downlink channel is arranged first, and then the $2^{nd}$ downlink channel is arranged. Thus, all downlink channels are arranged.

The values of Counter DAIs in the downlink control channels corresponding to the $1^{st}$ to $9^{th}$ downlink channels in the first HARQ window are shown in Table 4.

That is, the downlink channels are arranged according to the values of the Counter DAIs from small to large as follows:

the $9^{th}$ downlink channel, the $6^{th}$ downlink channel, the $7^{th}$ downlink channel, the $8^{th}$ downlink channel, the $3^{rd}$ downlink channel, the $5^{th}$ downlink channel, the $4^{th}$ downlink channel, the $1^{st}$ downlink channel, and the $2^{nd}$ downlink channel.

TABLE 4

| downlink channels in the first HARQ window | Counter DAIs in downlink control channels |
|---|---|
| $1^{st}$ downlink channel | 8 |
| $2^{nd}$ downlink channel | 9 |
| $3^{rd}$ downlink channel | 5 |
| $4^{th}$ downlink channel | 7 |
| $5^{th}$ downlink channel | 6 |
| $6^{th}$ downlink channel | 2 |
| $7^{th}$ downlink channel | 3 |
| $8^{th}$ downlink channel | 4 |
| $9^{th}$ downlink channel | 1 |

In an embodiment, the Total DAI in the downlink control channel corresponding to each of the above N downlink channels is used to indicate a time occasion of stopping sending the current downlink control channel, the number of downlink channels in the HARQ window that have been sent to the UE, and the feedback of HARQ-ACKs corresponding to these downlink on the first uplink channel.

A second embodiment describes a transmission process of a HARQ applied to a network device.

Figure 12:
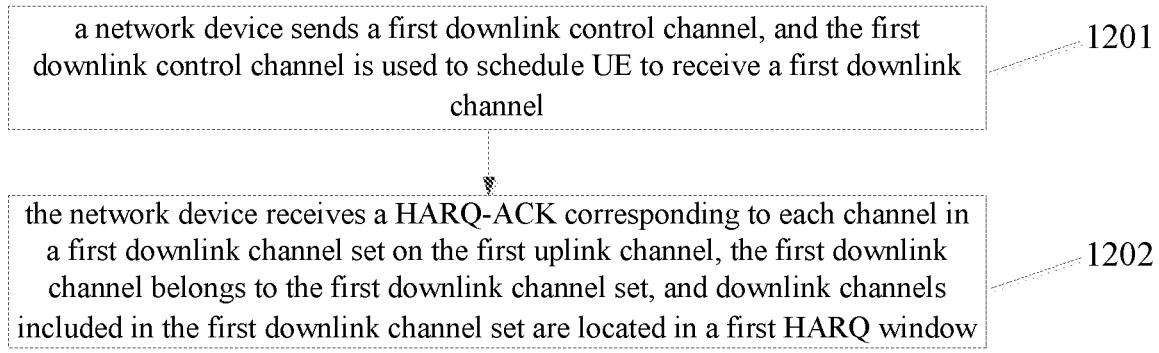
FIG. 12 is a flowchart of a method for transmitting a HARQ according to a second embodiment of the present application.

FIG. 12 is a flowchart of a method for transmitting a HARQ according to the second embodiment of the present application. The method includes following steps.

Step 1201, a network device sends a first downlink control channel, and the first downlink control channel is used to schedule UE to receive a first downlink channel.

Step 1202, the network device receives a HARQ-ACK corresponding to each channel in a first downlink channel set on the first uplink channel, the first downlink channel belongs to the first downlink channel set, and downlink channels included in the first downlink channel set are located in a first HARQ window.

A time difference between a first reference downlink channel in the first HARQ window and the first uplink channel is equal to a first threshold, a time difference between a second reference downlink channel in the first HARQ window and the first uplink channel is equal to a second threshold, the first threshold and the second threshold are respectively a maximum value and a minimum value of duration supported by first timing information in the first downlink control channel, a start time occasion of the first reference downlink channel is a start time occasion of the first HARQ window, and an end time occasion of the second reference downlink channel is an end time occasion of the first HARQ window.

Alternatively, the time difference between the first reference downlink channel in the first HARQ window and the first uplink channel is equal to a first reference value, where the first reference value is a time difference between downlink data transmission used by the UE and its corresponding HARQ-ACK; the start time occasion of the first reference downlink channel is the start time occasion of the first HARQ window, and the end time occasion of the second reference downlink channel is the end time occasion of the first HARQ window.

The time period of the first reference downlink channel and the second reference downlink channel are both the same as the time period of the first uplink channel.

Alternatively, the time period of the first reference downlink channel and the second reference downlink channel are both the same as the time period of the first reference uplink channel, and the first reference uplink channel corresponds to the first uplink channel.

The downlink channels included in the first downlink channel set belong to at least two cells, the first reference downlink channel and the second reference downlink channel are located in a first cell, and the first cell is a cell where the first uplink channel is located.

The first downlink channel set includes all downlink channels in the first HARQ window.

Alternatively, the first downlink channel set includes N downlink channels in the first HARQ window. A downlink control channel corresponding to the $M^{th}$ downlink channel among the N downlink channels includes the first timing information, and the first timing information is used to indicate to send HARQ-ACK corresponding to the $M^{th}$ downlink channel at the time when the first uplink channel locates, where N is an integer greater than or equal to 1, and M is an integer not greater than N.

The first downlink channel set is composed of N downlink channels in the first HARQ window, and the time difference between each of the N downlink channels and the first uplink channel satisfies the time difference between the downlink data transmission used by the UE and its corresponding HARQ-ACK.

The first downlink channel set includes N downlink channels in the first HARQ window.

The downlink control channels respectively corresponding to the N downlink channels all include a counter Downlink Assignment Index (DAI). The counter DAI is used to indicate a downlink channel index counter value.

The counter DAIs in the downlink control channels respectively corresponding to the N downlink channels meet any one or any combination of the following:

if the sending time occasion of a downlink control channel corresponding to the $R_1^{th}$ downlink channel among the N downlink channels is earlier than the sending time occasion of a downlink control channel corresponding to the $R_2^{th}$ downlink channel, then a downlink channel index counter value corresponding to the $R_1^{th}$ downlink channel is smaller than a downlink channel index counter value corresponding to the $R_2^{th}$ downlink channel, where both $R_1$ and $R_2$ are integers not greater than N;

if the sending time occasions of downlink control channels corresponding to Q downlink channels among the N downlink channels are the same, and the end time occasion of the $Q_1^{th}$ downlink channel among the Q downlink channels is earlier than the end time occasion of the $Q_2^{th}$ downlink channel, then a downlink channel index counter value corresponding to the $Q_1^{th}$ downlink channel is smaller than a downlink channel index counter value corresponding to the $Q_2^{th}$ downlink channel, where Q is an integer not greater than N, both $Q_1$ and $Q_2$ are integers not greater than Q; and if the sending time occasions of downlink control channels corresponding to W downlink channels among the N downlink channels are the same, the end time occasion of the $W_1^{th}$ downlink channel among the W downlink channels and the end time occasion of the $W_2^{th}$ downlink channel among the W downlink channels are the same, and an index of a cell where the $W_1^{th}$ downlink channel is located is smaller than an index of a cell where the $W_2^{th}$ downlink channel is located, a counter value corresponding to the $W_1^{th}$ downlink channel is smaller than a downlink channel index counter value corresponding to the $W_2^{th}$ downlink channel, where W is an integer not greater than N, and both $W_1$ and $W_2$ are integers not greater than W.

A downlink control channel corresponding to the $M^{th}$ downlink channel among the N downlink channels includes second timing information, and the second timing information is used to indicate to receive downlink data within the time period of the $M^{th}$ downlink channel.

The first uplink channel is a PUCCH or a PUSCH.

The understanding of the above-mentioned related technical features at gNodeB side may refer to the understanding of the corresponding technical features at UE side.

Figure 13:
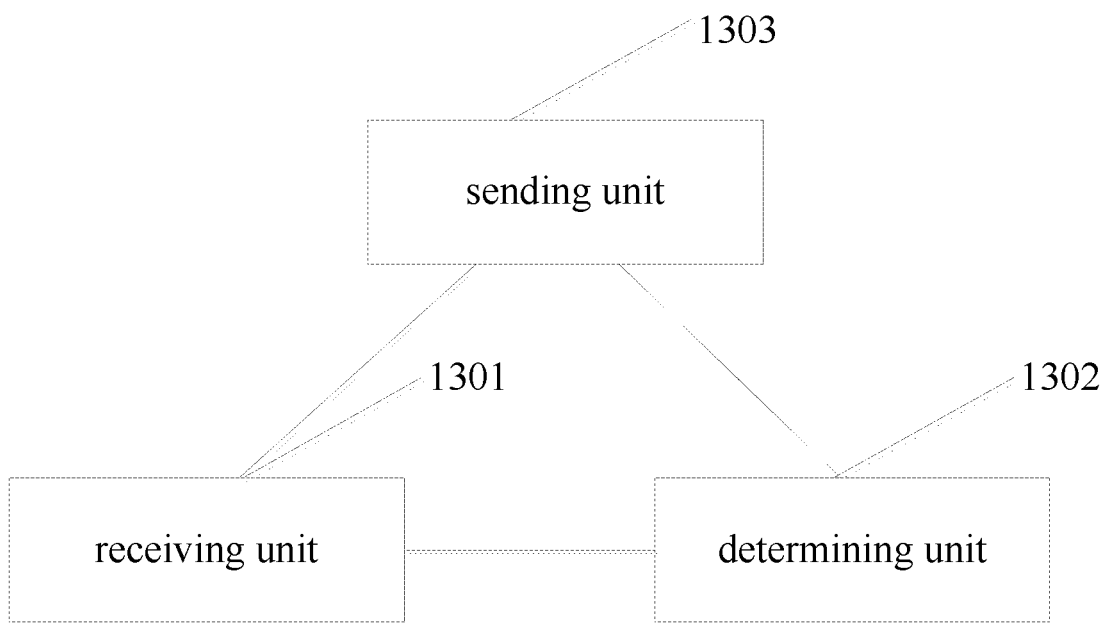
FIG. 13 is a structural diagram of an apparatus applied to the first embodiment according to embodiments of the present application.

Based on the same inventive concept, the embodiments of the present application also propose a HARQ transmission apparatus, which may be applied to the UE, referring to FIG. 13. FIG. 13 is a structural diagram of an apparatus applied to the first embodiment according to embodiments of the present application. The apparatus includes a receiving unit 1301, a determining unit 1302 and a sending unit 1303.

The receiving unit 1301 is configured to receive a first downlink control channel, and the first downlink control channel is used by a network device to schedule the UE to receive a first downlink channel.

The determining unit 1302 is configured to determine a first uplink channel.

The sending unit 1303 is configured to send a HARQ-ACK corresponding to each channel in a first downlink channel set on the first uplink channel determined by the determining unit 1302, the first downlink channel received by the receiving unit 1301 belongs to the first downlink channel set, and downlink channels included in the first downlink channel set are located in a first HARQ window.

A time difference between a first reference downlink channel in the first HARQ window and the first uplink channel is equal to a first threshold, a time difference between a second reference downlink channel in the first HARQ window and the first uplink channel is equal to a second threshold, the first threshold and the second threshold are respectively a maximum value and a minimum value of duration supported by first timing information in the first downlink control channel, a start time occasion of the first reference downlink channel is a start time occasion of the first HARQ window, and an end time occasion of the second reference downlink channel is an end time occasion of the first HARQ window.

The time period of the first reference downlink channel and the time period of the second reference downlink channel are both the same as the time period of the first uplink channel.

Alternatively, the time period of the first reference downlink channel and the time period of the second reference downlink channel are both the same as the time period of a first reference uplink channel, and the first reference uplink channel corresponds to the first uplink channel.

The downlink channels included in the first downlink channel set belong to at least two cells, the first reference downlink channel and the second reference downlink channel are located in a first cell, and the first cell is a cell where the first uplink channel is located.

The first downlink channel set includes all downlink channels in the first HARQ window, or the first downlink channel set includes N downlink channels in the first HARQ window, a downlink control channel corresponding to the $M^{th}$ downlink channel among the N downlink channels includes the first timing information, and the first timing information is used to indicate to send HARQ-ACK corresponding to the $M^{th}$ downlink channel at the time when the first uplink channel locates, where N is an integer greater than or equal to 1, and M is an integer not greater than N.

A downlink control channel corresponding to each of the N downlink channels includes a counter downlink allocation index, and the counter downlink allocation index is used to indicate a downlink channel index counter value.

The counter downlink allocation index included in the downlink control channel corresponding to each of the N downlink channels meets any one or any combination of following:

if sending time of a downlink control channel corresponding to the $R_1^{th}$ downlink channel among the N downlink channels is earlier than sending time of a downlink control channel corresponding to the $R_2^{th}$ downlink channel among the N downlink channels, a downlink channel index counter value corresponding to the $R_1^{th}$ downlink channel is smaller than a downlink channel index counter value corresponding to the $R_2^{th}$ downlink channel, where both $R_1$ and $R_2$ are integers not greater than N;

if sending time of downlink control channels corresponding to Q downlink channels among the N downlink channels is the same, and an end time occasion of the $Q_1^{th}$ downlink channel among the Q downlink channels is earlier than an end time occasion of the $Q_2^{th}$ downlink channel among the Q downlink channels, a downlink channel index counter value corresponding to the $Q_1^{th}$ downlink channel is smaller than a downlink channel index counter value corresponding to the $Q_2^{th}$ downlink channel, where Q is an integer not greater than N, and both $Q_1$ and $Q_2$ are integers not greater than Q; and if sending time of downlink control channels corresponding to W downlink channels among the N downlink channels is the same, and an end time occasion of the $W_1^{th}$ downlink channel among the W downlink channels and an end time occasion of the $W_2^{th}$ downlink channel among the W downlink channels are the same, an index of a cell where the $W_1^{th}$ downlink channel is located is smaller than an index of a cell where the $W_2^{th}$ downlink channel is located, and a downlink channel index counter value corresponding to the $W_1^{th}$ downlink channel is smaller than a downlink channel index counter value corresponding to the $W_2^{th}$ downlink channel, where W is an integer not greater than N, and both $W_1$ and $W_2$ are integers not greater than W.

A downlink control channel corresponding to the $M^{th}$ downlink channel among the N downlink channels includes second timing information, and the second timing information is used to indicate to receive downlink data within the time period of the $M^{th}$ downlink channel.

The first uplink channel is a PUCCH or a PUSCH.

Figure 14:
FIG. 14 is a structural diagram of an apparatus applied to the second embodiment.

Based on the same inventive concept, the present application also proposes a HARQ transmission apparatus, which may be applied to the network device, referring to FIG. 14. FIG. 14 is a structural diagram of an apparatus applied to the second embodiment. The apparatus includes a sending unit 1401 and a receiving unit 1402.

The sending unit 1401 is configured to send a first downlink control channel, and the first downlink control channel is used to schedule User Equipment, UE, to receive a first downlink channel.

the receiving unit 1402 is configured to receive a HARQ-ACK corresponding to each channel in a first downlink channel set on the first uplink channel, the first downlink channel belonging to the first downlink channel set, and downlink channels included in the first downlink channel set being located in a first HARQ window.

A time difference between a first reference downlink channel in the first HARQ window and the first uplink channel is equal to a first threshold, a time difference between a second reference downlink channel in the first HARQ window and the first uplink channel is equal to a second threshold, the first threshold and the second threshold are respectively a maximum value and a minimum value of duration supported by first timing information in the first downlink control channel, a start time occasion of the first reference downlink channel is a start time occasion of the first HARQ window, and an end time occasion of the second reference downlink channel is an end time occasion of the first HARQ window.

The time period of the first reference downlink channel and the time period of the second reference downlink channel are both the same as the time period of the first uplink channel; or the time period of the first reference downlink channel and the time period of the second reference downlink channel are both the same as the time period of a first reference uplink channel, and the first reference uplink channel corresponds to the first uplink channel.

The downlink channels included in the first downlink channel set belong to at least two cells, the first reference downlink channel and the second reference downlink channel are located in a first cell, and the first cell is a cell where the first uplink channel is located.

The first downlink channel set includes all downlink channels in the first HARQ window, or the first downlink channel set includes N downlink channels in the first HARQ window, a downlink control channel corresponding to the $M^{th}$ downlink channel among the N downlink channels includes the first timing information, and the first timing information is used to indicate to send HARQ-ACK corresponding to the $M^{th}$ downlink channel at the time when the first uplink channel locates, where N is an integer greater than or equal to 1, and M is an integer not greater than N.

The first downlink channel set includes N downlink channels in the first HARQ window.

A downlink control channel corresponding to each of the N downlink channels includes a counter downlink allocation index, and the counter downlink allocation index is used to indicate a downlink channel index counter value.

The counter downlink allocation index included in the downlink control channel corresponding to each of the N downlink channels meets any one or any combination of following:

if sending time of a downlink control channel corresponding to the $R_1^{th}$ downlink channel among the N downlink channels is earlier than sending time of a downlink control channel corresponding to the $R_2^{th}$ downlink channel among the N downlink channels, a downlink channel index counter value corresponding to the $R_1^{th}$ downlink channel is smaller than a downlink channel index counter value corresponding to the $R_2^{th}$ downlink channel, where both $R_1$ and $R_2$ are integers not greater than N;

if sending time of downlink control channels corresponding to Q downlink channels among the N downlink channels is the same, and an end time occasion of the $Q_1^{th}$ downlink channel among the Q downlink channels is earlier than an end time occasion of the $Q_2^{th}$ downlink channel among the Q downlink channels, a downlink channel index counter value corresponding to the $Q_1^{th}$ downlink channel is smaller than a downlink channel index counter value corresponding to the $Q_2^{th}$ downlink channel, where Q is an integer not greater than N, and both Q1 and Q2 are integers not greater than Q; and if sending time of downlink control channels corresponding to W downlink channels among the N downlink channels is the same, and an end time occasion of the $W_1^{th}$ downlink channel among the W downlink channels and an end time occasion of the $W_2^{th}$ downlink channel among the W downlink channels are the same, an index of a cell where the $W_1^{th}$ downlink channel is located is smaller than an index of a cell where the $W_2^{th}$ downlink channel is located, and a downlink channel index counter value corresponding to the $W_1^{th}$ downlink channel is smaller than a downlink channel index counter value corresponding to the $W_2^{th}$ downlink channel, where W is an integer not greater than N, and both W1 and W2 are integers not greater than W.

A downlink control channel corresponding to the $M^{th}$ downlink channel among the N downlink channels includes second timing information, and the second timing information is used to indicate to receive downlink data within the time period of the $M^{th}$ downlink channel.

The first uplink channel is a PUCCH or a PUSCH.

Each of the above two apparatus includes one or more memories and one or more processors.

The one or more memories store one or more instruction modules, which are configured to be executed by the one or more processors.

The units included in each apparatus are included in the one or more instruction modules.

Figure 15:
FIG. 15 is a diagram of a system applied to the above technology according to embodiments of the present application.

Based on the same inventive concept, the present application also proposes a HARQ transmission system, referring to FIG. 15. FIG. 15 is a diagram of a system applied to the above technology according to embodiments of the present application. The system includes UE and a network device.

The UE is configured to receive a first downlink control channel, and the first downlink control channel is used by the network device to schedule the UE to receive a first downlink channel; determine a first uplink channel; and send a HARQ-ACK corresponding to each channel in a first downlink channel set on the first uplink channel, the first downlink channel belongs to the first downlink channel set, and downlink channels included in the first downlink channel set are located in a first HARQ window.

The network device is configured to send the first downlink control channel, and the first downlink control channel is used to schedule the UE to receive the first downlink channel; and receive the HARQ-ACK corresponding to each channel in the first downlink channel set on the first uplink channel, the first downlink channel belongs to the first downlink channel set, and the downlink channels included in the first downlink channel set are located in the first HARQ window.

A time difference between a first reference downlink channel in the first HARQ window and the first uplink channel is equal to a first threshold, a time difference between a second reference downlink channel in the first HARQ window and the first uplink channel is equal to a second threshold, the first threshold and the second threshold are respectively a maximum value and a minimum value of duration supported by first timing information in the first downlink control channel, a start time occasion of the first reference downlink channel is a start time occasion of the first HARQ window, and an end time occasion of the second reference downlink channel is an end time occasion of the first HARQ window.

The specific implementation of the UE and the network device in the system may refer to the UE in the first embodiment and the gNodeB in the second embodiment, which will not be described in detail herein.

In the embodiments of the present application, the UE sends the HARQ-ACK corresponding to each channel in the first downlink channel set on the first uplink channel. The corresponding HARQ window is determined according to the timing range of a first time indication in the DCI and the time of the first uplink channel. The first downlink channel belongs to the first downlink channel set, and the downlink channels included in the first downlink channel set are located in the first HARQ window. With this technical solution, a HARQ feedback window corresponding to the HARQ-ACKs sent on the uplink channel can be determined, and the HARQ-ACK codebook can also be determined.

With the transmission method of uplink control information described in the embodiments of the present application, the HARQ-ACK codebook can be determined in a radio communication system in which a timing relationship between data scheduling and the scheduled data transmission is flexible and a timing relationship between downlink data transmission and its corresponding HARQ-ACK is also flexible. In the embodiments of the present application, the dynamic HARQ-ACK codebook determined based on the order of DAIs in the downlink control channels may satisfy the delay and efficiency requirements of uplink control information transmission in the NR system.

Those skilled in the art can understand that all or part of steps in the method provided by the above embodiments can be implemented by instructing related hardware by a computer program, the computer program may be stored in a non-transitory computer-readable medium, and above method steps are included when the computer program is executed. The medium includes a magnetic disk, an optical disk, a Read-Only Memory (ROM) and so on.

The embodiments of the present application also provide a non-transitory storage medium for storing computer-readable instructions that, when executed, cause at least one processor to execute the above method.

The technical features of the above embodiments may be arbitrarily combined. For the sake of simplicity, not all possible combinations of the technical features in the above embodiments are described. However, as long as there is no contradiction in the combination of these technical features, it should be considered within the scope of the specification.

The foregoing is only several embodiments of the present disclosure, and the protection scope of the present disclosure is not limited to this. It should be noted that any modification and improvement which can be made by those skilled in the art within the principle of the present disclosure should be covered in the protection scope of the present disclosure. And thus, the protection scope of the present disclosure should be defined by the claims.

What is claimed is:

1. A method for transmitting a Hybrid Automatic Repeat ReQuest, HARQ, comprising:
   receiving, by User Equipment, UE, a first downlink control channel, and the first downlink control channel being used by a network device to schedule the UE to receive a first downlink channel;
   determining, by the UE, a first uplink channel; and
   sending, by the UE, a HARQ-ACK corresponding to each channel in a first downlink channel set on the first uplink channel, the first downlink channel belonging to the first downlink channel set, and downlink channels included in the first downlink channel set being located in a first HARQ window;
   wherein a time difference between a first reference downlink channel in the first HARQ window and the first uplink channel is equal to a first threshold, a time difference between a second reference downlink channel in the first HARQ window and the first uplink channel is equal to a second threshold, the first threshold and the second threshold are respectively a maximum value and a minimum value of duration supported by first timing information in the first downlink control channel, a start time occasion of the first reference downlink channel is a start time occasion of the first HARQ window, and an end time occasion of the second reference downlink channel is an end time occasion of the first HARQ window.

2. The method of claim 1, wherein a time period of the first reference downlink channel and a time period of the second reference downlink channel are both the same as a time period of the first uplink channel; or
   a time period of the first reference downlink channel and a time period of the second reference downlink channel are both the same as a time period of a first reference uplink channel, and the first reference uplink channel corresponds to the first uplink channel.

3. The method of claim 1, wherein the downlink channels included in the first downlink channel set belong to at least two cells, the first reference downlink channel and the second reference downlink channel are located in a first cell, and the first cell is a cell where the first uplink channel is located.

4. The method of claim 1, wherein the first downlink channel set includes all downlink channels in the first HARQ window, or
   the first downlink channel set includes N downlink channels in the first HARQ window, a downlink control channel corresponding to the $M^{th}$ downlink channel among the N downlink channels includes the first timing information, and the first timing information is used to indicate to send HARQ-ACK corresponding to the $M^{th}$ downlink channel at a time when the first uplink channel locates, wherein N is an integer greater than or equal to 1, and M is an integer not greater than N.

5. The method of claim 1, wherein the first downlink channel set includes N downlink channels in the first HARQ window;
   a downlink control channel corresponding to each of the N downlink channels includes a counter downlink allocation index, and the counter downlink allocation index is used to indicate a downlink channel index counter value.

6. The method of claim 5, wherein the counter downlink allocation index included in the downlink control channel corresponding to each of the N downlink channels meets any one or any combination of following items:
   if a sending time occasion of a downlink control channel corresponding to the $R_1^{th}$ downlink channel among the N downlink channels is earlier than a sending time occasion of a downlink control channel corresponding to the $R_2^{th}$ downlink channel among the N downlink channels, a downlink channel index counter value corresponding to the $R_1^{th}$ downlink channel is smaller than a downlink channel index counter value corresponding to the $R_2^{th}$ downlink channel, wherein both R1 and R2 are integers not greater than N;
   if sending time occasions of downlink control channels corresponding to Q downlink channels among the N downlink channels are the same, and an end time occasion of the $Q_1^{th}$ downlink channel among the Q downlink channels is earlier than an end time occasion of the $Q_2^{th}$ downlink channel among the Q downlink channels, a downlink channel index counter value corresponding to the $Q_1^{th}$ downlink channel is smaller than a downlink channel index counter value corresponding to the $Q_2^{th}$ downlink channel, wherein Q is an integer not greater than N, and both $Q_1$ and $Q_2$ are integers not greater than Q; and
   if sending time occasions of downlink control channels corresponding to W downlink channels among the N downlink channels are the same, an end time occasion of the $W_1^{th}$ downlink channel among the W downlink channels and an end time occasion of the $W_2^{th}$ downlink channel among the W downlink channels are the same, and an index of a cell where the $W_1^{th}$ downlink channel is located is smaller than an index of a cell where the $W_2^{th}$ downlink channel is located, a downlink channel index counter value corresponding to the $W_1^{th}$ downlink channel is smaller than a downlink channel index counter value corresponding to the $W_2^{th}$ downlink channel, wherein W is an integer not greater than N, and both $W_1$ and $W_2$ are integers not greater than W.

7. The method of claim 6, wherein a downlink control channel corresponding to the $M^{th}$ downlink channel among the N downlink channels includes second timing information, and the second timing information is used to indicate to receive downlink data within a time period of the $M^{th}$ downlink channel.

8. The method of claim 1, wherein the first uplink channel is a Physical Uplink Control Channel, PUCCH, or a Physical Uplink Shared Channel, PUSCH.

9. An apparatus for transmitting a Hybrid Automatic Repeat ReQuest, HARQ, comprising one or more memories and one or more processors;

the one or more memories are configured to store one or more instructions that, when executed by the one or more processors, cause the one or more processors to perform:
receiving a first downlink control channel, and the first downlink control channel being used by a network device to schedule User Equipment, UE, to receive a first downlink channel;
determining a first uplink channel; and
sending a HARQ-ACK corresponding to each channel in a first downlink channel set on the first uplink channel, the first downlink channel belonging to the first downlink channel set, and downlink channels included in the first downlink channel set being located in a first HARQ window; wherein a time difference between a first reference downlink channel in the first HARQ window and the first uplink channel is equal to a first threshold, a time difference between a second reference downlink channel in the first HARQ window and the first uplink channel is equal to a second threshold, the first threshold and the second threshold are respectively a maximum value and a minimum value of duration supported by first timing information in the first downlink control channel, a start time occasion of the first reference downlink channel is a start time occasion of the first HARQ window, and an end time occasion of the second reference downlink channel is an end time occasion of the first HARQ window.

10. The apparatus of claim 9, wherein a time period of the first reference downlink channel and a time period of the second reference downlink channel are both the same as a time period of the first uplink channel; or
a time period of the first reference downlink channel and a time period of the second reference downlink channel are both the same as a time period of a first reference uplink channel, and the first reference uplink channel corresponds to the first uplink channel.

11. The apparatus of claim 9, wherein the downlink channels included in the first downlink channel set belong to at least two cells, the first reference downlink channel and the second reference downlink channel are located in a first cell, and the first cell is a cell where the first uplink channel is located.

12. The apparatus of claim 9, wherein the first downlink channel set includes all downlink channels in the first HARQ window, or
the first downlink channel set includes N downlink channels in the first HARQ window, a downlink control channel corresponding to the $M^{th}$ downlink channel among the N downlink channels includes the first timing information, and the first timing information is used to indicate to send HARQ-ACK corresponding to the $M^{th}$ downlink channel within a time period of the first uplink channel, wherein N is an integer greater than or equal to 1, and M is an integer not greater than N.

13. The apparatus of claim 9, wherein the first downlink channel set includes N downlink channels in the first HARQ window;
a downlink control channel corresponding to each of the N downlink channels includes a counter downlink allocation index, and the counter downlink allocation index is used to indicate a downlink channel index counter value.

14. The apparatus of claim 9, wherein the counter downlink allocation index included in the downlink control channel corresponding to each of the N downlink channels meets any one or any combination of following:
if sending time of a downlink control channel corresponding to the $R_1^{th}$ downlink channel among the N downlink channels is earlier than sending time of a downlink control channel corresponding to the $R_2^{th}$ downlink channel among the N downlink channels, a downlink channel index counter value corresponding to the $R_1^{th}$ downlink channel is smaller than a downlink channel index counter value corresponding to the $R_2^{th}$ downlink channel, wherein both R1 and R2 are integers not greater than N;
if sending time of downlink control channels corresponding to Q downlink channels among the N downlink channels is the same, and an end time occasion of the $Q_1^{th}$ downlink channel among the Q downlink channels is earlier than an end time occasion of the $Q_2^{th}$ downlink channel among the Q downlink channels, a downlink channel index counter value corresponding to the $Q_1^{th}$ downlink channel is smaller than a downlink channel index counter value corresponding to the $Q_2^{th}$ downlink channel, wherein Q is an integer not greater than N, and both Q1 and Q2 are integers not greater than Q; and
if sending time of downlink control channels corresponding to W downlink channels among the N downlink channels is the same, and an end time occasion of the $W_1^{th}$ downlink channel among the W downlink channels and an end time occasion of the $W_2^{th}$ downlink channel among the W downlink channels are the same, an index of a cell where the $W_1^{th}$ downlink channel is located is smaller than an index of a cell where the $W_2^{th}$ downlink channel is located, and a downlink channel index counter value corresponding to the $W_1^{th}$ downlink channel is smaller than a downlink channel index counter value corresponding to the $W_2^{th}$ downlink channel, wherein W is an integer not greater than N, and both $W_1$ and $W_2$ are integers not greater than W.

15. The apparatus of claim 14, wherein a downlink control channel corresponding to the $M^{th}$ downlink channel among the N downlink channels includes second timing information, and the second timing information is used to indicate to receive downlink data within a time period of the $M^{th}$ downlink channel.

16. The apparatus of claim 9, wherein the first uplink channel is a Physical Uplink Control Channel, PUCCH, or a Physical Uplink Shared Channel, PUSCH.

17. A non-transitory storage medium for storing computer-readable instructions that, when executed, cause at least one processor to perform:
receiving a first downlink control channel, and the first downlink control channel being used by a network device to schedule User Equipment, UE, to receive a first downlink channel;
determining a first uplink channel; and
sending a HARQ-ACK corresponding to each channel in a first downlink channel set on the first uplink channel, the first downlink channel belonging to the first downlink channel set, and downlink channels included in the first downlink channel set being located in a first HARQ window; wherein a time difference between a first reference downlink channel in the first HARQ window and the first uplink channel is equal to a first threshold, a time difference between a second reference downlink channel in the first HARQ window and the first uplink channel is equal to a second threshold, the first threshold and the second threshold are respectively a maximum value and a minimum value of duration supported by first timing information in the first downlink control channel, a start time occasion of the first reference downlink channel is a start time occasion of the first HARQ window, and an end time occasion of the second reference downlink channel is an end time occasion of the first HARQ window.

* * * * *